(12) United States Patent
Choi (10) Patent No.: US 7,995,182 B2
(45) Date of Patent: Aug. 9, 2011

(54) ARRAY SUBSTRATE FOR A LIQUID CRYSTAL DISPLAY DEVICE AND METHOD OF MANUFACTURING THE SAME

(75) Inventor: Byeong-Dae Choi, Daegu (KR)

(73) Assignee: LG Display Co., Ltd., Seoul (KR)

( * ) Notice: Subject to any disclaimer, the term of this patent is extended or adjusted under 35 U.S.C. 154(b) by 396 days.

(21) Appl. No.: 10/032,056

(22) Filed: Dec. 31, 2001

(65) Prior Publication Data

US 2002/0093600 A1  Jul. 18, 2002

(30) Foreign Application Priority Data

Jan. 18, 2001 (KR) .............................. 2001-0002971

(51) Int. Cl.
*G02F 1/1343* (2006.01)
(52) U.S. Cl. .................... 349/147; 349/139; 349/143
(58) Field of Classification Search ............... 349/43, 349/139, 142, 147, 143; 27/448, 773
See application file for complete search history.

(56) References Cited

U.S. PATENT DOCUMENTS

| | | | | |
|---|---|---|---|---|
| 4,918,504 A | * | 4/1990 | Kato et al. | 257/59 |
| 5,162,933 A | * | 11/1992 | Kakuda et al. | 349/46 |
| 5,825,437 A | * | 10/1998 | Seo et al. | 349/46 |
| 5,894,136 A | * | 4/1999 | Wook | 257/59 |
| 6,355,956 B1 | * | 3/2002 | Kim | 257/347 |
| 6,461,901 B1 | * | 10/2002 | Noguchi | 438/158 |

FOREIGN PATENT DOCUMENTS

| | | |
|---|---|---|
| JP | 2-44318 | 2/1990 |
| JP | 4-283938 | 10/1992 |
| JP | 6-35001 | 2/1994 |
| JP | 08-313934 | 11/1996 |
| JP | 12-180898 | 6/2000 |
| KR | 2000-1757 | 1/2000 |

* cited by examiner

*Primary Examiner* — Matthew E Warren
(74) *Attorney, Agent, or Firm* — Morgan, Lewis & Bockius LLP (57) ABSTRACT

An array substrate for a liquid crystal display device includes a substrate, a plurality of gate lines arranged transversely on the substrate, a plurality of data lines disposed orthogonal to the plurality of gate lines, a plurality of thin film transistors formed on the substrate adjacent to intersections of the gate lines and the data lines, each thin film transistor including a gate electrode, a gate insulation layer, an active layer, an ohmic contact layer, a source electrode, and a drain electrode, a plurality of pixel electrodes disposed at pixel regions defined by the intersections of the gate lines and the data lines, each pixel electrode connected to a corresponding one of the drain electrodes, and a metal layer formed on an entire surface of each of the data lines.

14 Claims, 8 Drawing Sheets

ARRAY SUBSTRATE FOR A LIQUID CRYSTAL DISPLAY DEVICE AND METHOD OF MANUFACTURING THE SAME

This application claims the benefit of Korean Patent Application No. 2001-2971, filed on Jan. 18, 2001, which is hereby incorporated by reference as if fully set forth herein.

BACKGROUND OF THE INVENTION

1. Field of the Invention

The present invention relates to liquid crystal display devices. More particularly it relates to an array substrate for the liquid crystal display device implementing transparent pixel electrodes, data lines, and source and drain electrodes.

2. Discussion of the Related Art

A liquid crystal display device uses the optical anisotropy and polarization properties of liquid crystal molecules to produce an image. Liquid crystal molecules have a definite alignment orientation due to their long, thin shapes. The alignment orientation can be controlled by application of an electric field. Accordingly, the alignment of the liquid crystal molecules can be altered by changing the applied electric field. Due to the optical anisotropy of the liquid crystal molecules, refraction of incident light is dependent upon the orientation of the aligned liquid crystal molecules. Therefore, by controlling the electric field applied to the liquid crystal molecules, an image can be produced by the liquid crystal display device.

Liquid crystal display (LCD) devices have wide application in office automation (OA) and video equipment because of their light weight, thin design, and low power consumption characteristics. Among the different types of LCD devices, active matrix LCDs (AM-LCDs), which have thin film transistors and pixel electrodes arranged in a matrix form, offer high resolution and superiority in displaying moving images. A typical LCD panel has an upper substrate, a lower substrate and a liquid crystal material layer interposed therebetween. The upper substrate, commonly referred to as a color filter substrate, includes a common electrode and color filters. The lower substrate, commonly referred to as an array substrate, includes switching elements, such as thin film transistors (TFT's), and pixel electrodes, for example.

As previously described, operation of an LCD device is based on the principle that the alignment direction of the liquid crystal molecules is dependent upon an applied electric field between the common electrode and the pixel electrode. Accordingly, the liquid crystal molecules function as an optical modulation element having variable optical characteristics that depend upon polarity of the applied voltage.

Figure 1:
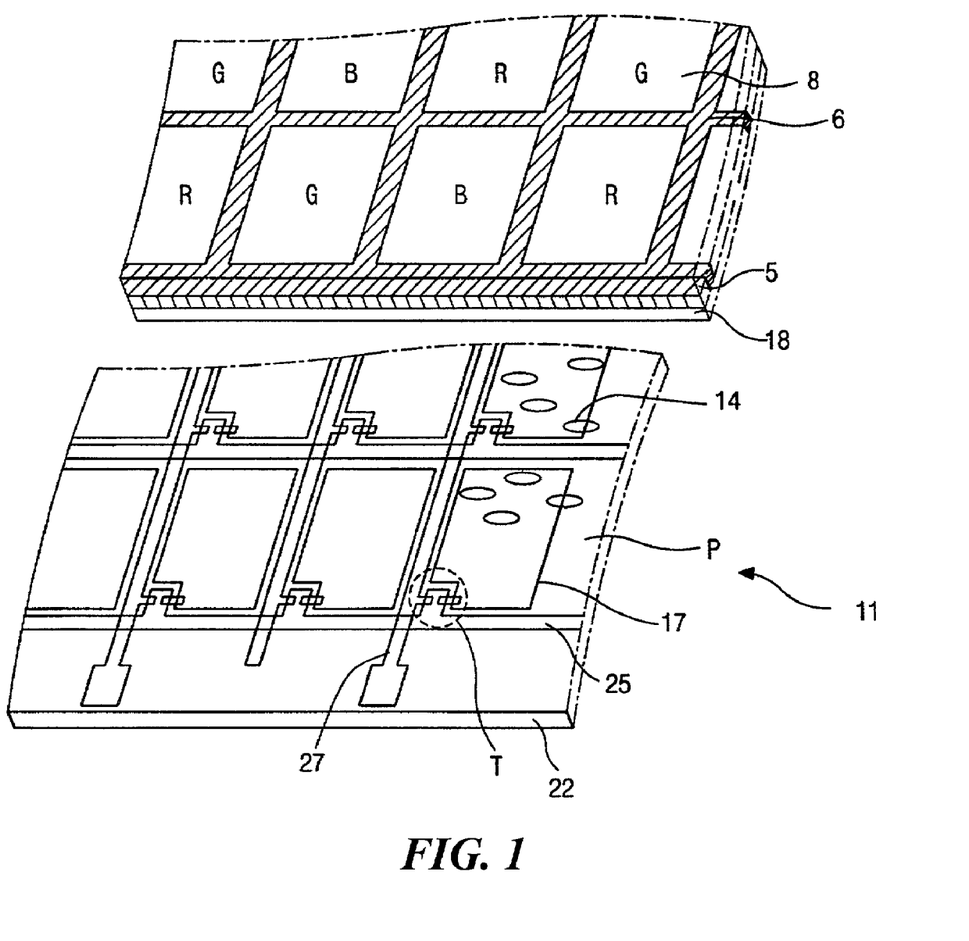
FIG. 1 is the configuration of an LCD device according to the related art.

FIG. 1 shows an LCD device according to the related art. In FIG. 1, the LCD device 11 includes an upper substrate 5, commonly referred to as a color filter substrate, and a lower substrate 22, commonly referred to as an array substrate, with a liquid crystal material layer 14 interposed therebetween. Within the upper substrate 5 and upon a surface that opposes the lower substrate 22, a black matrix 6 and a color filter layer 8 are formed in a shape of an array matrix and include a plurality of red (R), green (G), and blue (B) color filters surrounded by corresponding portions of the black matrix 6. Additionally, a common electrode 18 is formed on the upper substrate 5 to cover the color filter layer 8 and the black matrix 6. In the lower substrate 22 and upon a surface that opposes the upper substrate 5, a plurality of thin film transistors (TFT's) "T" are formed in a shape of an array matrix corresponding to the color filter layer 8. A plurality of crossing gate lines 25 and data lines 27 are positioned such that each TFT "T" is located adjacent to each intersection of the gate lines 25 and the data lines 27. Furthermore, a plurality of pixel electrodes 17 are formed on a pixel region "P" defined by the gate lines 25 and the data lines 27 of the lower substrate 22. The pixel electrode 17 includes a transparent conductive material having good transmissivity, such as indium-tin-oxide (ITO) or indium-zinc-oxide (IZO), for example.

In FIG. 1, a scanning signal is applied to a gate electrode of the TFT "T" through the gate line 25, and a data signal is applied to a source electrode of the TFT "T" through the data line 27. As a result, the liquid crystal molecules of the liquid crystal material layer 14 are aligned and arranged by operation of the TFT "T," and incident light passing through the liquid crystal layer 14 is controlled to display an image. However, since the pixel and common electrodes 17 and 18 are positioned on the upper and lower substrates 5 and 22, respectively, the electric field induced between the upper and lower substrates 5 and 22 is perpendicular to opposing surfaces of the upper and lower substrates 5 and 22. The liquid crystal display device has a high transmittance and a high aperture ratio, and because the common electrode 18 on the upper substrate 5 acts as a ground, the liquid crystal is shielded from static electricity.

Figure 2:
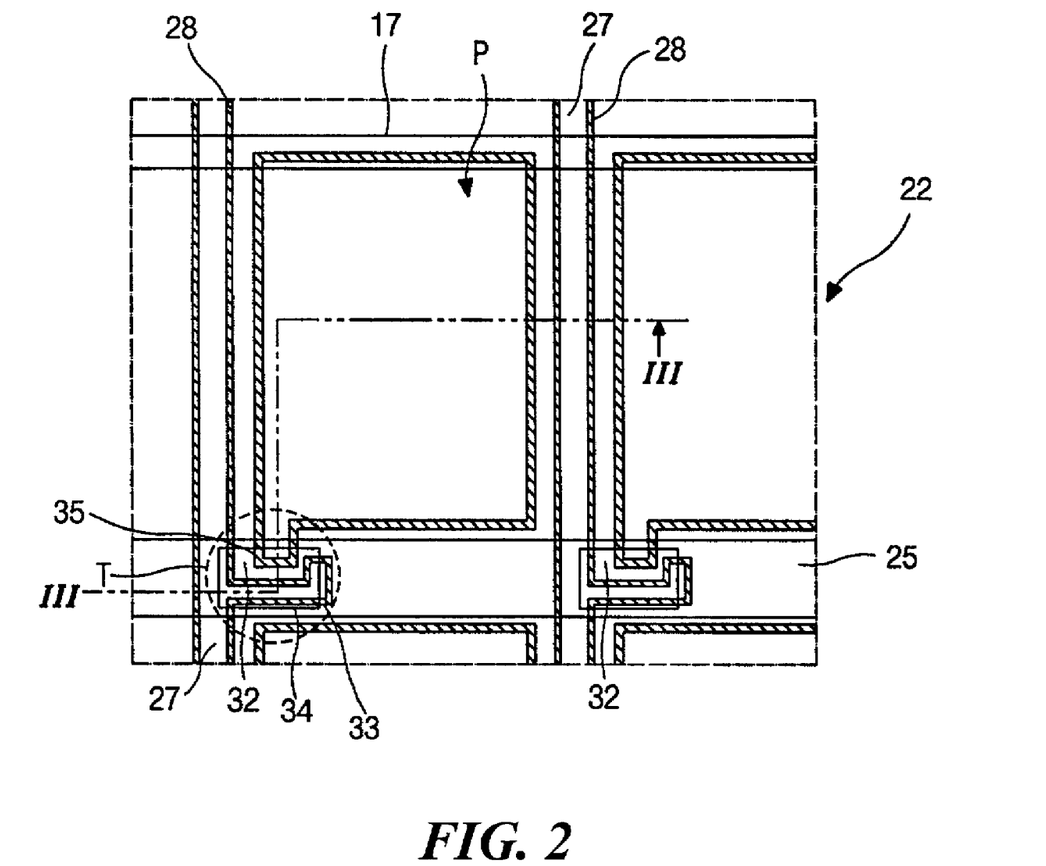
FIG. 2 is a partial plan view illustrating a pixel of an array substrate according to the related art.

FIG. 2 is a partial plan view illustrating a pixel of an array substrate according to the related art. In FIG. 2, an array substrate 22 includes a thin film transistor (TFT) "T" and a pixel electrode 17 at each pixel region "P" defined by a pair of orthogonal gate lines 25 and data lines 27. The TFT "T" is arranged at one corner of the pixel region "P" and includes a gate electrode 32, a source electrode 33, a drain electrode 35, and a semiconductor layer 34. The gate electrode 32 is formed within the gate line 25 near the intersection of the gate line 25 and data line 27. The source electrode 33 extends transversely from the data line 27 over the portion of the gate line 25. The drain electrode 35 extends from the pixel electrode 17 arranged in the pixel region "P," and is spaced apart from the source electrode 33 to form a channel region on the semiconductor layer 34.

The data line 27, the source electrode 34, the drain electrode 35 and the pixel electrode 17 are made of a transparent conductive material, such as indium tin oxide (ITO) or indium zinc oxide (IZO), for example. However, since the transparent conductive material has a relatively high electrical resistance as compared to other metallic materials, the data line 27 formed of the transparent conductive material increases signal delay, thereby degrading the reliability of the LCD device. Accordingly, to decrease the electrical resistance in the data line 27, an additional metal 28 having a low electrical resistance is formed at an edge portion of the data line 27 using electroplating of a metallic coating.

FIGS. 3A to 3F are cross-sectional views taken along III-III of FIG. 2, and show fabricating processes of an array substrate having the transparent data line and source electrode according to the related art.

Figure 3A:
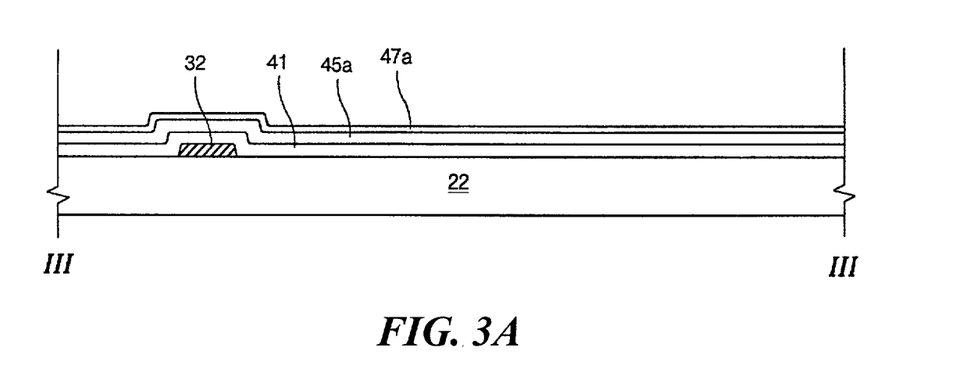
FIGS. 3A to 3F are cross-sectional views taken along III-III of FIG. 2, and show fabricating processes of an array substrate having the transparent data line and transparent source and drain electrodes according to the related art.

In FIG. 3A, a substrate 22 may be cleaned of organic materials and any foreign substances to promote adhesion with a first metal layer that may be subsequently deposited on the substrate 22 by a sputtering process, for example. The first metal layer is a metallic material, such as aluminum or aluminum neodymium (AlNd), for example. The first metal layer is subsequently patterned using a first mask to form a gate line 25 (of FIG. 2) in a transverse direction, and a gate electrode 32 that is a portion of the gate line 25. Alternatively, a double-layered structure may be used for the gate line 25 and the gate electrode 32. The double-layered structure includes an aluminum (Al) layer stacked with a molybdenum (Mo) layer or a chromium (Cr) layer, for example, that has high corrosion resistance and durability. Then, a gate insulation layer 41 is formed on a surface of the substrate 22 to cover the patterned first metal layer. The gate insulation layer 41 may include silicon oxide ($SiO_X$) or silicon nitride ($SiN_X$). A pure amorphous silicon (a-Si:H) layer 45a and a doped amorphous silicon ($n^+$ a-Si:H) layer 47a are sequentially formed upon the gate insulation layer 41.

Figure 3B:
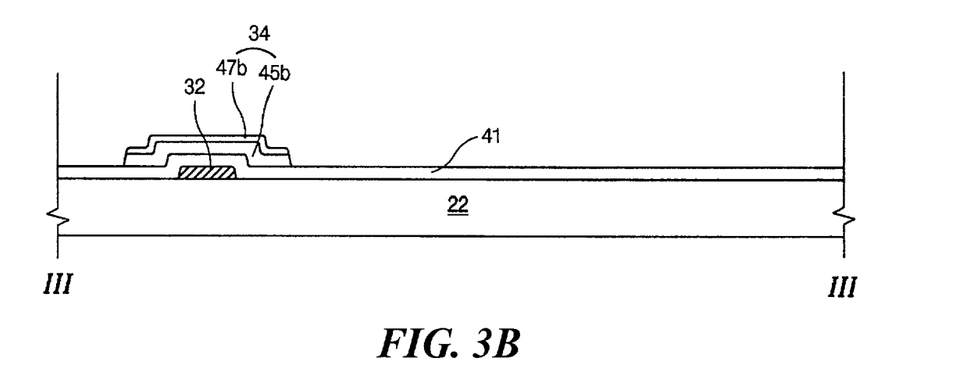

FIG. 3B shows a step of forming an active layer and an ohmic contact layer. In FIG. 3B, the pure amorphous silicon layer 45a and the doped amorphous silicon layer 47a are simultaneously patterned using a second mask to form an active layer 45b, and an ohmic contact layer 47b upon the gate insulation layer 41, respectively. Alternatively, the pure amorphous silicon layer 45a and the doped amorphous silicon layer 47a can be patterned by rear exposure using the patterned first metal as a mask, such that the active layer 45b and the ohmic contact layer 47b can be formed over the patterned first metal layer (i.e., over the gate line 25 of FIG. 2).

Figure 3C:
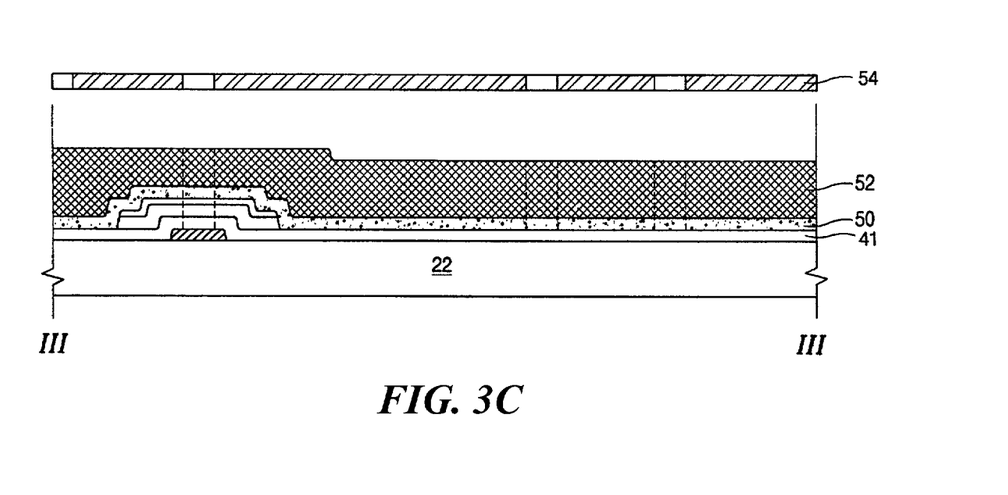

FIG. 3C shows a step of forming a data line, a source electrode, a drain electrode and a pixel electrode. In FIG. 3C, a transparent conductive material 50, such as indium tin oxide (ITO) or indium zinc oxide (IZO), is formed upon an entire surface of the gate insulation layer 41, thereby covering the active layer 45b and ohmic contact layer 47b. Thereafter, a photoresist layer 52 is formed on the transparent conductive material 50, and then a third mask 54 is aligned over the photoresist layer 52.

Figure 3D:
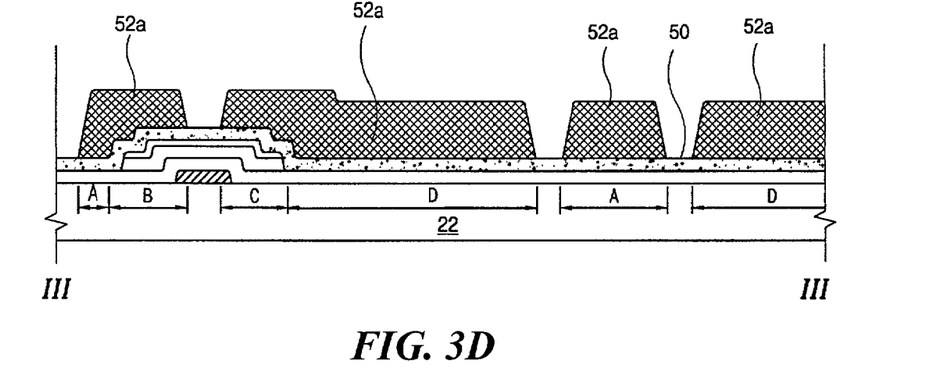

FIG. 3D shows a step of forming contact portions within the photoresist layer 52. In FIG. 3D, the photoresist layer 52 is developed to expose portions of the transparent conductive material 50. Residual photoresist layer portions 52a remain over a data portion "A," a source portion "B," a drain portion "C," and a pixel portion "D" of the transparent conductive material 50. Specifically, edge regions of the residual photoresist layer portions 52a are thinner than central regions thereof.

Figure 3E:
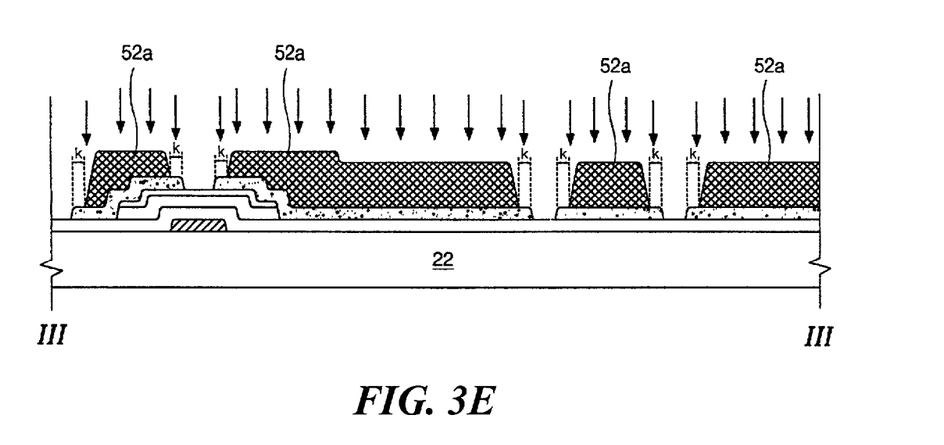

FIG. 3E shows a step of etching the residual photoresist layer portions 52a. In FIG. 3E, the residual photoresist layer portions 52a are sufficiently etched using a dry etching method, thereby removing the exposed portions of the transparent conductive material 50 (of FIG. 3D). Furthermore, the edge regions of the residual photoresist layer portions 52a are also removed to expose peripheral portions "K" of the etched transparent conductive material 50.

Figure 3F:
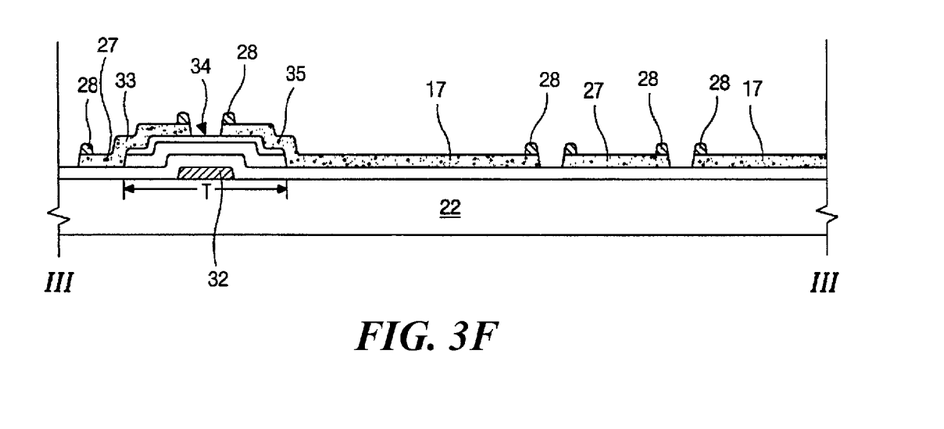

FIG. 3F shows a step of etching the peripheral portions "K" of the etched transparent conductive material 50. In FIG. 3F, the peripheral portions "K" of the etched transparent conductive material are plated with a second metal 28 using an electroplating process. The second metal 28 includes a low electrical resistance material such as copper (Cu) or aluminum (Al). Then, the residual photoresist layer portions 52a are completely removed from the etched transparent conductive material 50, and data lines 27, a source electrode 33, a drain electrode 35, and pixel electrodes 17 are formed on the substrate 22. The source electrode 33 extends from the data line 27, and the drain electrode 35 extends from the pixel electrode 17. The source and drain electrodes 33 and 35 are spaced apart from each other and overlap opposite ends of the gate electrode 32. Accordingly, the thin film transistor "T" includes the gate electrode 32, the semiconductor layer 34, and the source and drain electrode 33 and 35.

However, the data line 27, which includes the second metal 28 formed at peripheral regions thereof is problematic. Specifically, since the second metal 28 formed on the data line 27 is so small, the data line 27 has a relatively high electrical resistance. As a result, it is very difficult to steadily apply signals through the data line 27.

SUMMARY OF THE INVENTION

Accordingly, the present invention is directed to an array substrate for an LCD device that substantially obviates one or more of the problems due to limitations and disadvantages of the related art.

An object of the present invention is to provide an LCD device having improved image quality.

Another object of the present invention is to provide a method of forming an array substrate having a reduced number of processing steps.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a substrate, a plurality of gate lines arranged transversely on the substrate, a plurality of data lines disposed orthogonal to the plurality of gate lines, a plurality of thin film transistors formed on the substrate adjacent to intersections of the gate lines and the data lines, each thin film transistor including a gate electrode, a gate insulation layer, an active layer, an ohmic contact layer, a source electrode, and a drain electrode, a plurality of pixel electrodes disposed at pixel regions defined by the intersections of the gate lines and the data lines, each pixel electrode connected to a corresponding one of the drain electrodes, and a metal layer formed on an entire surface of each of the data lines.

In another aspect, a method of fabricating an array substrate for a liquid crystal display device includes forming a first metal layer on a substrate, forming a gate line and a gate electrode, forming a gate insulation layer to cover the first metal layer, forming a pure amorphous silicon layer and a doped amorphous silicon layer on the gate insulation layer, forming an ohmic contact layer and an active layer over the gate electrode, forming a transparent conductive material on the gate insulation layer to cover the active layer and the ohmic contact layer, forming a photoresist layer on the transparent conductive material, patterning the photoresist layer using a mask, forming a data line, a pixel electrode, a source electrode and a drain electrode, and forming a second metal layer on an entire surface of the data line.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate an embodiment of the present invention and together with the description serve to explain the principles of that invention. In the drawings.

DETAILED DESCRIPTION OF THE ILLUSTRATED EMBODIMENTS

Reference will now be made in detail to an illustrated embodiment of the present invention, an example of which is shown in the accompanying drawings. Wherever possible, the same reference numbers will be used throughout the drawings to refer to similar parts.

Figure 4:
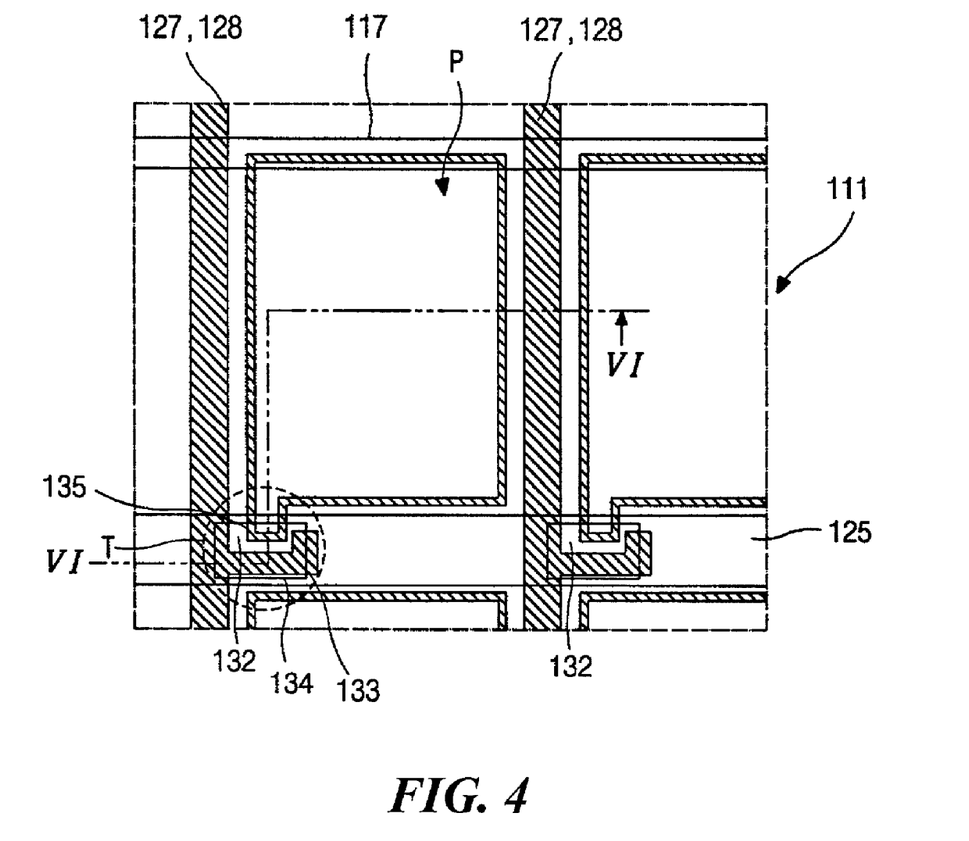
FIG. 4 is a partial plan view of an exemplary array substrate illustrating pixel and data lines according to the present invention.

FIG. 4 is a partial plan view of an exemplary array substrate illustrating pixels and data lines according to the present invention. In FIG. 4, an array substrate 111 includes a thin film transistor (TFT) "T," and a pixel electrode 117 formed at each pixel region "P," which is defined by a pair gate line 125 and data line 127. The gate line 125 may be arranged in a transverse direction, and a data line 127 may be arranged perpendicular to the gate line 125 on the array substrate 111. The TFT "T" may include a gate electrode 132, a source electrode 133, a drain electrode 135, and a semiconductor layer 134, and may be arranged at a corner of the pixel region "P" where the data line 127 crosses the gate line 125. The gate electrode 132 may be formed within the gate line 125 near the crossing to the gate 125 and data 127 lines. Moreover, a portion of the gate line 125 at the crossing of the gate line 125 and data line 127 may serve as the gate electrode 132. The source electrode 133 extends transversely from the data line 127 over the portion of the gate line 125. The drain electrode 135 extends from the pixel electrode 117 arranged in the pixel region "P," and may be spaced apart from the source electrode 133 to form a channel region on the semiconductor layer 134.

The data line 127, the source electrode 133, the drain electrode 135, and the pixel electrode 117 may include a transparent conductive material, such as indium tin oxide (ITO) or indium zinc oxide (IZO), for example. Furthermore, an additional metal 128 may be formed on an entire surface of the data line 127 and source electrode 133. Specifically, the data line 127 and the source electrode 133 may be covered by the additional metal 128.

Figure 5:
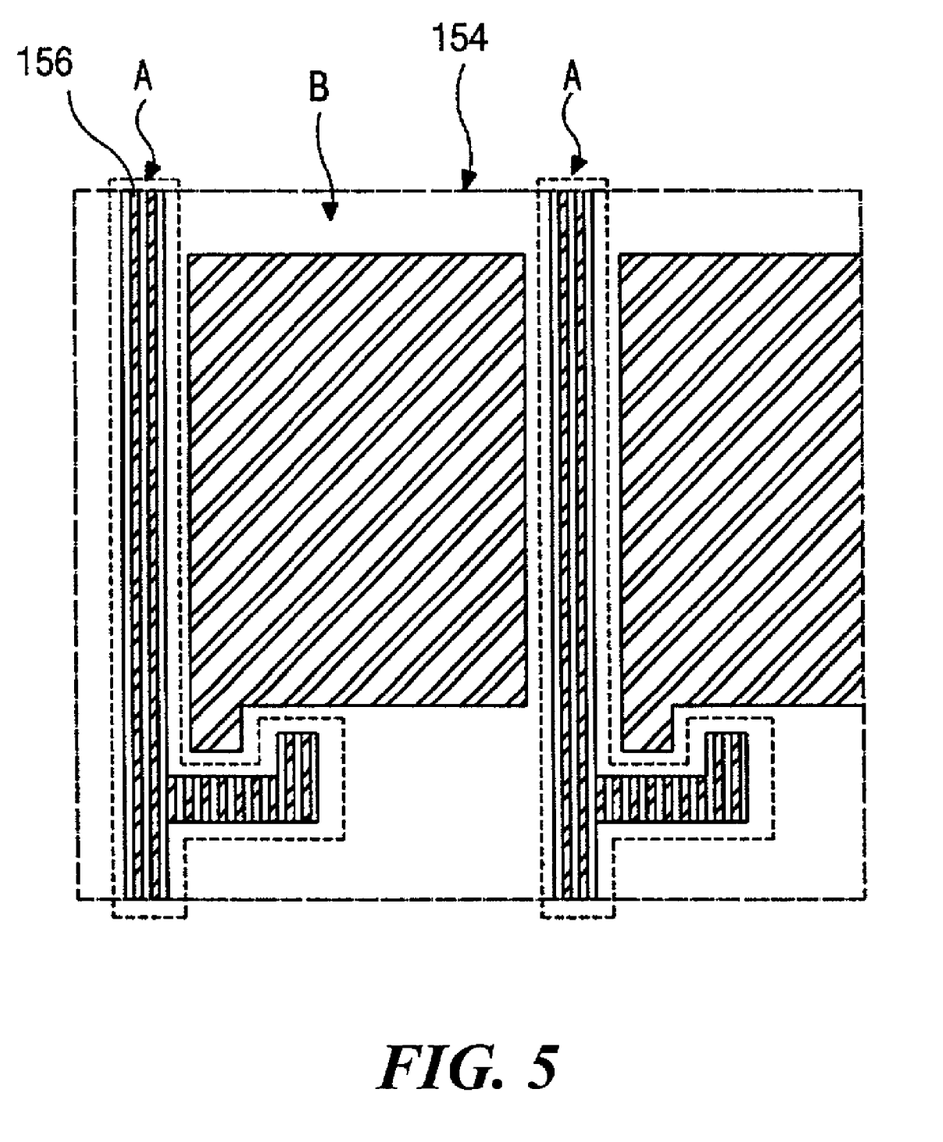
FIG. 5 is a plan view of an exemplary mask according to the present invention.

FIG. 5 is a plan view of an exemplary mask according to the present invention. In FIG. 5, a mask 154 may include a plurality of slits 156 formed in portions corresponding to the data line 127 and source electrode 133 (of FIG. 4), and portions corresponding to the pixel electrode 117 and the drain electrode 135 that may not have slits. Specifically, the mask 154 may include an area "A" having the plurality of slits 156, and an area "B" that transmits light for exposing a photoresist layer during an exposure process. As a result of diffraction of the light passing through the plurality of slits 156, the amount and intensity of the light decrease when exposing the photoresist layer for forming the data line 127 and the source electrode 133. Accordingly, portions of the photoresist layer that correspond to the area "A" are slightly exposed to the light, while a portion corresponding to the area "B" is fully exposed to the light. Subsequently, a portion of the photoresist layer corresponding to the area "A" is removed during a dry etching process for exposed portions of the transparent conductive material.

Figure 6A:
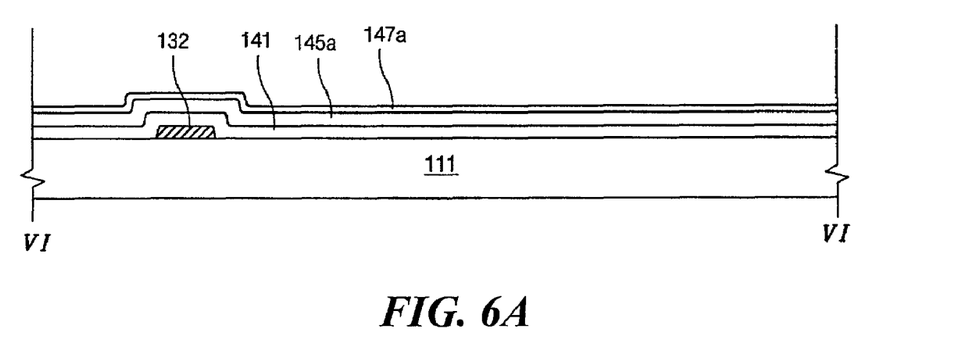
FIG. 6A to 6F are cross-sectional views taken along VI-VI of FIG. 4, and show exemplary fabricating processes of an array substrate according to the present invention.

FIGS. 6A to 6F are cross-sectional views taken along VI-VI of FIG. 4, and show exemplary fabricating processes of an array substrate according to the present invention. In FIG. 6A, a substrate 111 may be cleaned of organic materials and foreign substances to promote adhesion with a first metal layer that may be subsequently deposited on the substrate 111 by a sputtering process, for example. The first metal layer may include a metallic material, such as aluminum (Al), aluminum neodymium (AlNd), copper (Cu), tungsten (W), chromium (Cr) or molybdenum (Mo), for example. The first metal layer may be patterned using a first mask to form a gate line 125 (of FIG. 4) in a transverse direction, and a gate electrode 132 that may include a portion of the gate line 125. Alternatively, a double-layered structure may be used to form the gate line 125 and the gate electrode 132. The double-layered structure may include an aluminum (Al) layer stacked with a molybdenum (Mo) layer or a chromium (Cr) layer, for example, which has high corrosion resistance and durability.

Thereafter, a gate insulation layer 141 may be formed on a surface of the substrate 111 to cover the patterned first metal layer. The gate insulation layer 141 may include silicon oxide ($SiO_x$) and silicon nitride ($SiN_x$), for example. After forming the gate insulation layers 141 on the substrate 111 to cover the patterned first metal layer, a pure amorphous silicon (a-Si:H) layer 145a and a doped amorphous silicon ($n^+$ a-Si:H) layer 147a may be sequentially formed upon the gate insulation layer 141.

Figure 6B:
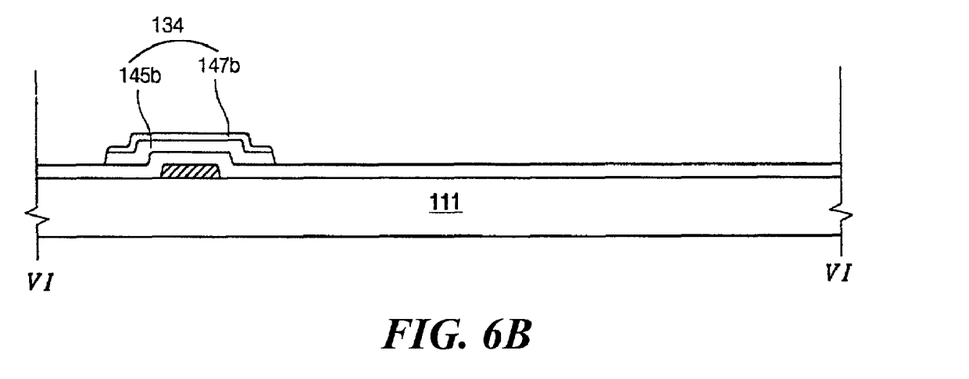

In FIG. 6B, the pure amorphous silicon layer 145a and the doped amorphous silicon layer 147a may be simultaneously patterned using a second mask, for example, to form an active layer 145b and an ohmic contact layer 147b upon the gate insulation layer 141. Accordingly, a semiconductor layer 134 may include the active layer 145b, and ohmic contact layer 147b. Alternatively, the pure amorphous silicon layer 145a and the doped amorphous silicon layer 147a may be patterned by a rear exposure process using the patterned first metal as a mask, whereby the active layer 145b and the ohmic contact layer 147b may be formed over the patterned first metal layer (i.e., over the gate line 125 of FIG. 4).

Figure 6C:
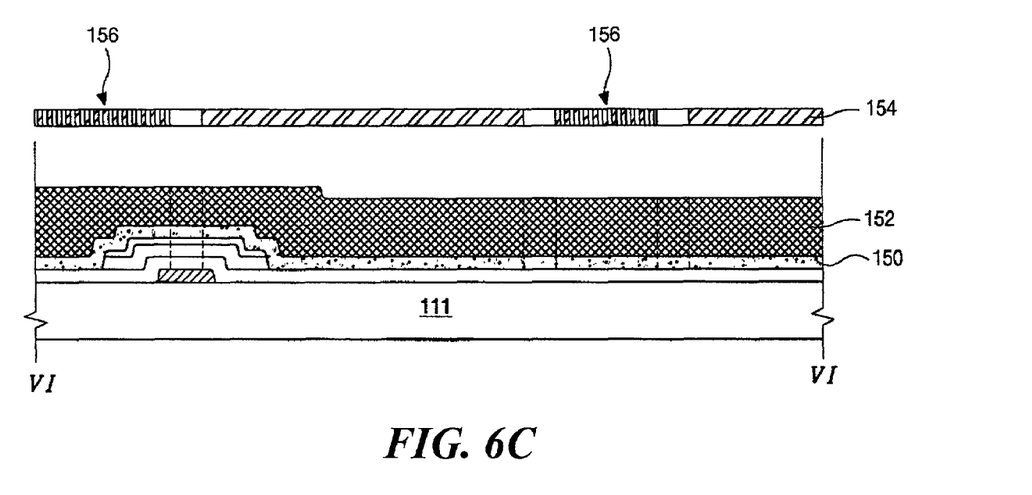

In FIG. 6C, a transparent conductive material 150, such as indium tin oxide (ITO), indium zinc oxide (IZO), zinc oxide ($ZnO_x$), tin oxide ($SnO_x$) or indium oxide ($InO_x$), for example, may be formed upon an entire surface of the gate insulation layer 141, thereby covering the active layer 145b and ohmic contact layer 147b. Thereafter, a photoresist layer 152 may be formed on the transparent conductive material 150, and then a third mask 154 may be aligned over the photoresist layer 152 for an exposure process. The mask 154 may include a plurality of slits 156 that correspond to the data line 127 and source electrode 133 (in FIG. 6F) that may be formed in a later step. Alternatively, a plurality of pinholes may be implemented instead of the plurality of slits 156.

Figure 6D:
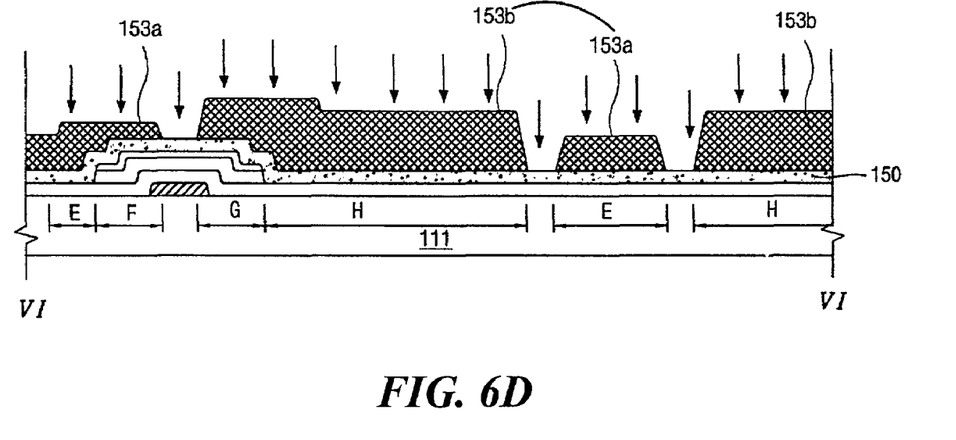
Figure 6E:
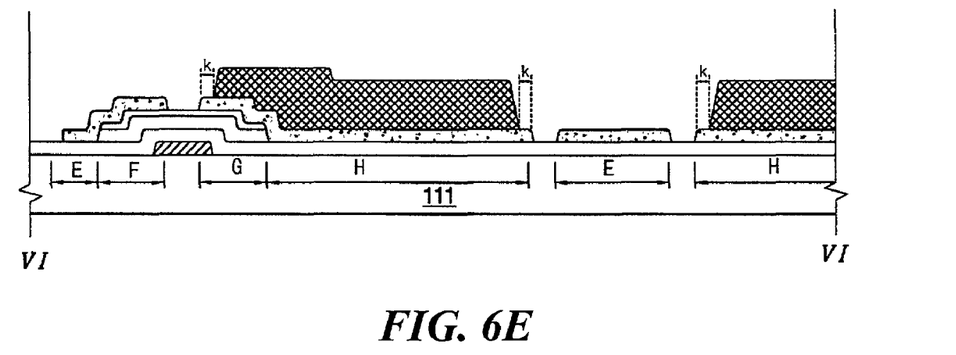

In FIG. 6D, after the exposure process, the photoresist layer 152 may be developed to expose portions of the transparent conductive material 150. Accordingly, residual photoresist layer portions 153 remain over a data portion "E," a source portion "F," a drain portion "G," and a pixel portion "H" of the transparent conductive material 150. Specifically, edge regions of the residual photoresist layer portions 153 may have a thickness that is smaller than a thickness of central portions of the residual photoresist layer portions 153. Furthermore, due to the diffraction of the light, a first residual photoresist layer portion 153a corresponding to the data portion "E" and the source portion "F" may have a thickness that is smaller than a second residual photoresist layer portion 153b corresponding to the drain portion "G" and the pixel portion "H." The residual photoresist layer portions 153 of the photoresist layer 152 may be removed In FIG. 6E, the exposed portions of the transparent conductive material 150 (in FIG. 6D) may be removed. Furthermore, the edge regions of the second residual photoresist layer portions 153b may be removed to expose peripheral portions "K" of the etched transparent conductive material 150. While etching the exposed portions of the transparent conductive material 150 (in FIG. 6D) and exposing the peripheral portions "K," the first residual photoresist layer portion 153a on the data portion "E" and the source portion "F" may be removed since the first residual photoresist layer portion 153a has a thickness that is smaller than a thickness of the second residual photoresist layer portion 153b.

Figure 6F:
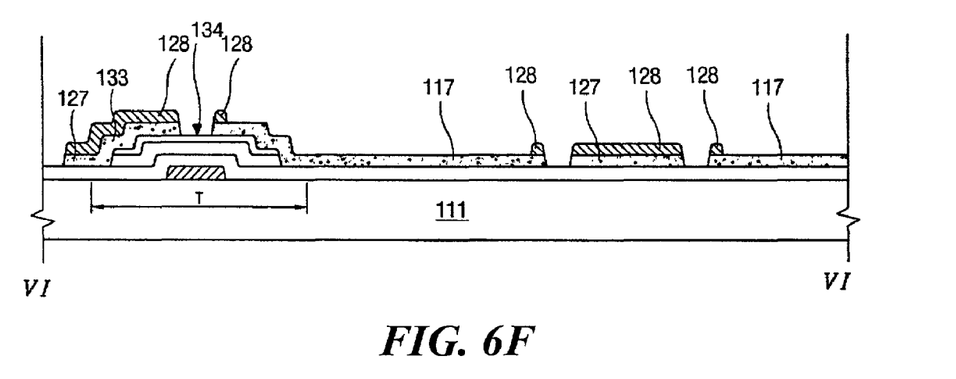

In FIG. 6F, an additional metal 128 may formed on the data portion "E," the source portion "F," and the peripheral portions "K" of the etched transparent conductive material using an electroplating process, for example. The second metal 28 may include copper (Cu), aluminum (Al), gold (Au) or silver (Ag), for example, which have low electrical resistance. Then, the second residual photoresist layer portion 153b may be removed. Data lines 127 and a source electrode 133, each of which may have the additional metal 128 formed on entire surfaces thereof, may be formed over the substrate 111. Additionally, a drain electrode 135 and pixel electrodes 117, each of which may have the additional metal 128 formed at peripheral regions thereof, may be formed over the substrate 111. In FIG. 6F, the source electrode 133 may extend from the data line 127, and the drain electrode 135 may extend from the pixel electrode 117. The source and drain electrodes 133 and 135 may be spaced apart from each other and overlap opposite ends of the gate electrode 132. Accordingly, the thin film transistor "T" may include the gate electrode 132, the semiconductor layer 34, and the source and drain electrode 133 and 135.

According to the present invention alluded above, since the data line is formed with the pixel electrode by the same mask process, the steps of fabricating the array substrate decrease. Furthermore, since the data line and source electrode have the additional metal that has low electrical resistance, the image quality of the LCD device is improved and the large LCD device having high resolution can be obtained.

It will be apparent to those skilled in the art that various modifications and variation can be made in the array substrate of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
   a substrate;
   a plurality of gate lines arranged transversely on the substrate;
   a plurality of data lines disposed orthogonal to the plurality of gate lines;
   a plurality of thin film transistors formed on the substrate adjacent to intersections of the gate lines and the data lines, each thin film transistor including a gate electrode, a gate insulation layer, an active layer, an ohmic contact layer, a source electrode, and a drain electrode, the source electrode extended from each of the data lines and overlapping a portion of the gate electrode;
   a plurality of pixel electrodes disposed at pixel regions defined by the intersections of the gate lines and the data lines, each pixel electrode connected to a corresponding one of the drain electrodes; and
   a metal layer formed on an entire surface of each of the data lines and an entire of a top surface of the source electrode, and at peripheral portions of the drain electrode,
   wherein the metal layer exposes an entire of side surfaces of the source electrode,
   wherein the drain electrode and the pixel electrodes are formed from the same material, and
   wherein the source electrode is positioned between the ohmic contact layer and the metal layer and formed of a transparent conductive material selected from a group including indium-tin-oxide, indium-zinc-oxide, zinc oxide, tin oxide and indium oxide.

2. The array substrate according to claim 1, wherein the gate insulation layer is disposed on the gate electrode.

3. The array substrate according to claim 1, wherein the active layer is disposed on the gate insulation layer, and the ohmic contact layer is disposed on the active layer.

4. The array substrate according to claim 1, wherein the source electrode and the drain electrode are disposed on the ohmic contact layer.

5. The array substrate according to claim 4, wherein the source electrode extends from one of the data lines.

6. The array substrate according to claim 4, wherein the drain electrode extends from one of the pixel electrodes.

7. The array substrate according to claim 4, wherein the drain electrode and source electrode include at least a transparent conductive material.

8. The array substrate according to claim 7, wherein each data line includes at least the transparent conductive material.

9. The array substrate according to claim 7, wherein each pixel electrode includes the transparent conductive material.

10. The array substrate according to claim 7, wherein the transparent conductive material is selected from a group including indium tin oxide, indium zinc oxide, zinc oxide, thin oxide and indium oxide.

11. The array substrate according to claim 1, wherein the gate insulation layer is disposed on the plurality of gate lines.

12. The array substrate according to claim 1, wherein the metal layer is selected from a group including aluminum (Al), copper (Cu), gold (Au) and silver (Ag).

13. The array substrate according to claim 12, wherein the metal layer is formed on an entire surface of the source electrode.

14. The array substrate according to claim 12, wherein the metal layer is formed at peripheral portions of the plurality of pixel electrodes.

* * * * *